(12) United States Patent
Bruck et al.

(10) Patent No.: US 9,315,904 B2
(45) Date of Patent: Apr. 19, 2016

(54) MATERIAL DEPOSITION USING POWDER AND FOIL

(71) Applicant: Siemens Energy, Inc., Orlando, FL (US)

(72) Inventors: Gerald J. Bruck, Oviedo, FL (US); Ahmed Kamel, Orlando, FL (US)

(73) Assignee: Siemens Energy, Inc., Orlando, FL (US)

( * ) Notice: Subject to any disclaimer, the term of this patent is extended or adjusted under 35 U.S.C. 154(b) by 130 days.

(21) Appl. No.: 14/155,560

(22) Filed: Jan. 15, 2014

(65) Prior Publication Data
US 2015/0197859 A1 Jul. 16, 2015

(51) Int. Cl.
| | |
|---|---|
| B05D 3/00 | (2006.01) |
| C08J 7/18 | (2006.01) |
| G21H 5/00 | (2006.01) |
| C23C 24/10 | (2006.01) |
| C23C 6/00 | (2006.01) |
| B22F 3/105 | (2006.01) |
| B22F 7/04 | (2006.01) |

(52) U.S. Cl.
CPC .............. *C23C 24/106* (2013.01); *B22F 3/1055* (2013.01); *B22F 7/04* (2013.01); *B23K 26/342* (2015.10); *C23C 6/00* (2013.01); *B22F 2007/045* (2013.01); *Y10T 428/12736* (2015.01)

(58) Field of Classification Search
CPC ....... B22F 3/105; B22F 3/1052; B23K 26/34; B23K 26/345; C23C 24/10; C23C 24/106
USPC .......... 148/522, 523, 525; 427/551, 553, 554, 427/559
See application file for complete search history.

(56) References Cited

U.S. PATENT DOCUMENTS

| | | | | |
|---|---|---|---|---|
| 6,090,497 | A * | 7/2000 | Mori et al. ................ | 428/641 |
| 6,750,430 | B2 * | 6/2004 | Kelly .................... | B21C 37/042 |
| | | | | 219/146.31 |
| 6,936,118 | B2 * | 8/2005 | Ando et al. ................ | 148/522 |
| 2008/0226843 | A1 * | 9/2008 | Fukubayashi et al. ........ | 427/597 |
| 2013/0136868 | A1 | 5/2013 | Bruck | |

FOREIGN PATENT DOCUMENTS

| | | |
|---|---|---|
| DE | 102004002268 A1 | 8/2005 |
| EP | 1464791 A1 | 10/2004 |

OTHER PUBLICATIONS

G. J. Bruck, A Study of Fluxing Agents in High Power Laser Beam Cladding, Mar. 7, 1989, Westinghouse R&D Center, Pittsburgh, Pennsylvania.*

* cited by examiner

*Primary Examiner* — Michael Wieczorek

(57) ABSTRACT

The loss of aluminum content during the laser (20) deposition of superalloy powders (16) is accommodated by melting pure aluminum foil (14) with the superalloy powder to increase a concentration of aluminum in the melt pool (24) so that the resulting layer of deposited material (26) has a desired elemental composition. Foils, screens or strips of any material may be melted with powders to achieve any desired cladding composition, including a graded composition across a thickness of a clad layer (50).

19 Claims, 2 Drawing Sheets

US 9,315,904 B2

MATERIAL DEPOSITION USING POWDER AND FOIL

FIELD OF THE INVENTION

This invention relates generally to the field of materials science, and more particularly to material deposition processes, and in one embodiment to the laser deposition of powdered superalloy materials.

BACKGROUND OF THE INVENTION

United States Patent Application Publication No US 2013/0136868 A1, authored by the present inventors, discloses improved methods for depositing superalloy materials that are otherwise difficult to weld. Those methods include the laser melting of powdered superalloy material together with powdered flux material to form a melt pool under a layer of protective slag. The slag performs a cleaning function in addition to protecting the molten alloy material from the atmosphere. Upon solidification, the slag is removed from the newly deposited superalloy material to reveal a crack-free surface and deposit. Such methods have been shown to be effective even for superalloy materials which are beyond the traditional region of weldability, as shown in FIG. 1.

BRIEF DESCRIPTION OF THE DRAWINGS

The invention is explained in the following description in view of the drawings that show

DETAILED DESCRIPTION OF THE INVENTION

The present inventors have found that when superalloy powders are deposited in a high power laser cladding process, there can be a significant decrease in the aluminum content between the original powder material and the clad material. The mechanisms responsible for this loss are speculated to include the vaporization of the element as well as the oxidation, nitridation and/or reaction of aluminum with flux material which incorporates aluminum into a slag, thereby making less available for the clad metal alloy deposit. This loss of aluminum may be particularly detrimental in some applications because aluminum is important for high temperature oxidation/corrosion resistance, and because aluminum contributes to strengthening as a result of gamma prime formation. Other elemental constituents, as well, may become fugitive to various degrees during powder deposition processes depending upon the materials and process variables of a particular powder deposition process.

The present inventors have developed a powder deposition process which innovatively compensates for the loss of an elemental constituent from the powder material during the deposition process by incorporating a melted foil of the fugitive material into the melt pool along with the melted powder material. The resulting increased concentration of the fugitive material in the melt pool compensates for the loss of the element through the deposition process, resulting in the deposition of a cladding material with a desired composition. In this way, it is now possible for the deposited material to have the same composition as the original alloy powder or to have a somewhat purposefully modified variation of such composition. For example, an aluminum foil may be used having a thickness which exactly compensates for the quantity of aluminum lost during the deposition process, or it may be beneficial to use a thicker aluminum foil to provide a concentration of aluminum in the depositing cladding layer that is greater than existed in the original powdered alloy. Note that foil thickness, as used herein, may include a single layer of foil, or it may include a composite thickness of more than one layer of foil. When using more than one layer of foil, the layers may be positioned adjacent to each other or they may be separated by powder. It is envisioned that a range of foil thicknesses may be used, including foils ranging from 0.00004 to 2 mm in certain embodiments.

Figure 1:
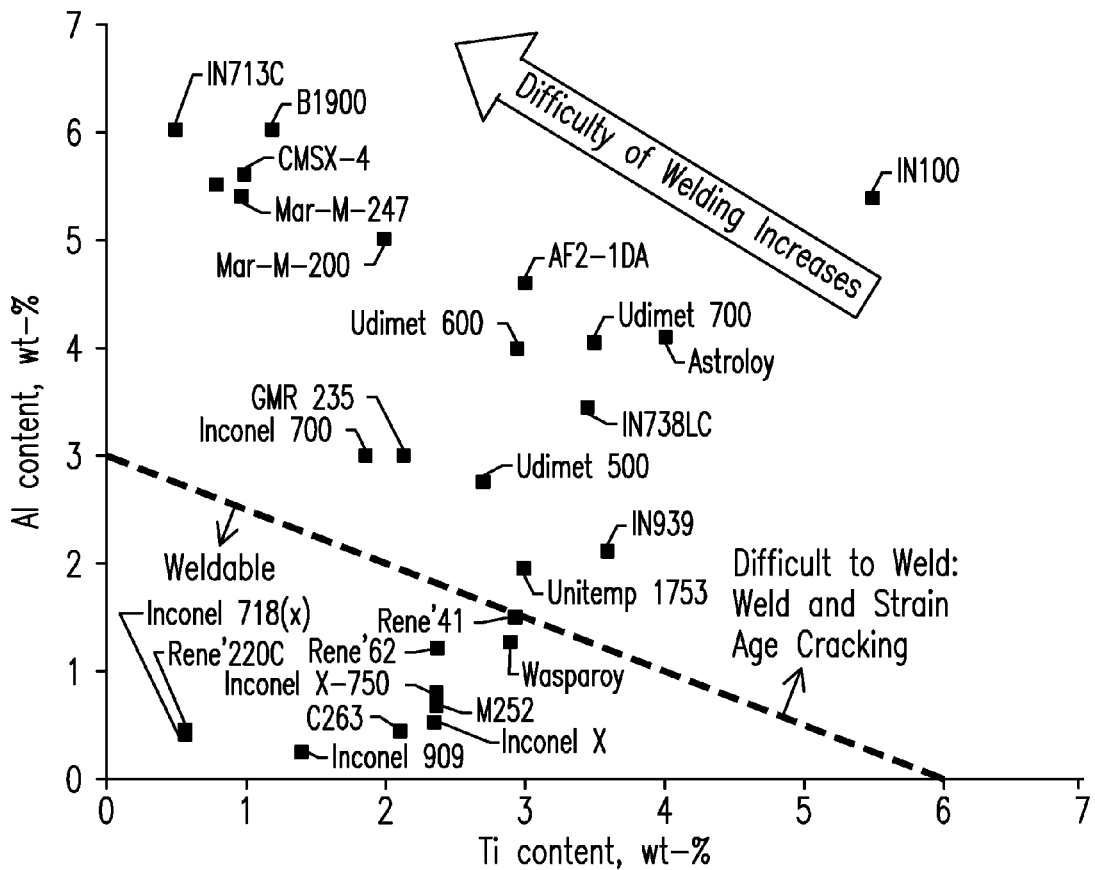
FIG. 1 is a prior art chart illustrating the relative weldability of various superalloy materials.
Figure 2:
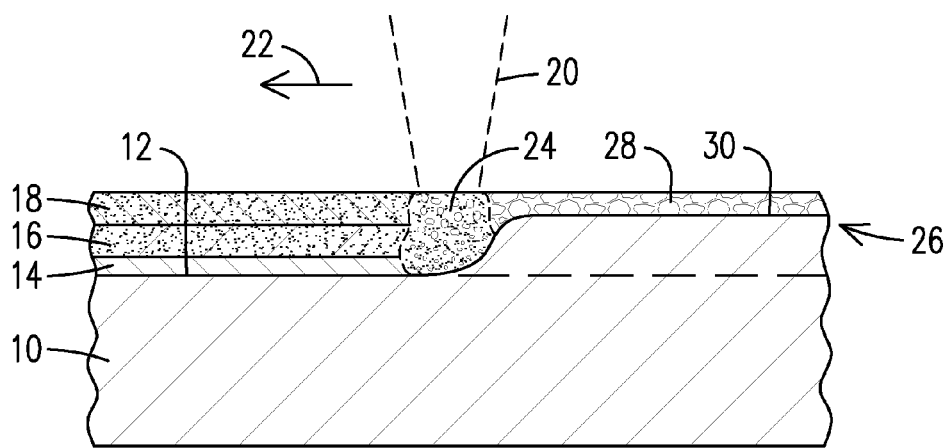
FIG. 2 illustrates a method of depositing a powdered material.

A process in accordance with one embodiment is illustrated in FIG. 2. A substrate material 10, such as a superalloy material having an aluminum content of greater than 3 wt %, has a surface 12 onto which it is desired to deposit additional material by a powder deposition process The surface 12 may be cleaned or otherwise prepared as desired by any method known in the art, with the details of such cleaning or preparation being outside the scope of the present disclosure. A layer of foil 14 is positioned onto the substrate surface 12, and then a layer of powdered metal 16, such as powdered superalloy material having the same composition as that of the substrate 10, is placed onto the foil 14. The term metal is used herein in a general sense and is meant to include alloys of metals, as appropriate. One may appreciate that, in other embodiments, the foil 14 may be placed on top of or within the layer of powdered metal 16. A layer of flux material 18 is then placed to cover the layer of powdered metal 16, although the use of flux and the physical location of the flux relative to the powdered metal 16 and foil 14 are optional depending upon the particular application. For example, the flux may be mixed with the powdered metal or the flux may be integral with the powdered metal as conglomerate particulates. An energy beam 20, such as a laser beam, is traversed 22 across the substrate 10 to melt the powders 18, 16 and the foil 14 to from a melt pool 24. It will be appreciated by one skilled in the art that a thin surface layer of the substrate 10 may also be melted to ensure complete bonding, but to simplify the discussion herein, that constituent to the melt pool 24 is ignored. As the energy beam 20 moves onward, the melt pool 24 solidifies to form a layer of deposited material 26 on the substrate 10 covered by a layer of slag 28. The slag 28 is later removed (not shown) to expose the newly clad surface 30. The process can be repeated over the newly clad surface 30 any number of times to produce a layer of deposited material having a desired thickness.

When the process illustrated by FIG. 2 is used to deposit alloy Mar-M-247 powder onto a Mar-M-247 substrate, for example, the metal foil 14 may be selected to be pure (i e at least 99% pure) aluminum of a desired thickness such that the layer of deposited material 26 matches the composition of the Mar-M-247 substrate in spite of significant losses of aluminum through the laser deposition process.

Alternatively, pure aluminum powder rather than pure aluminum foil may be melted into the melt pool to compensate for the fugitive aluminum. However, pure aluminum powder presents a large surface area per unit volume and its use would incorporate a large quantity of oxides into the melt pool. The process illustrated by FIG. 2 avoids that problem because a foil has a relatively lower surface area per unit volume. Furthermore, the use of a foil ensures an even distribution of the extra aluminum across the clad surface 12, thereby eliminating the need to evenly mix aluminum powder with a much denser superalloy powder. Moreover, possession of aluminum powder is controlled because of the risk of explosion, whereas aluminum foils having purity levels above 99% and even up to 99.999% are commercially available in thicknesses as small as 0.00004 mm. Thus, the amount of aluminum added to the melt pool 24 may be precisely tailored to accommodate the amount of aluminum loss for any particular application.

The process illustrated by FIG. 2 may be used to compensate for the loss of fugitive materials other than aluminum, for example titanium or any of the other constituent elements of the deposited metal powder. Furthermore, elements that are not fugitive or that are not constituent elements of the deposited metal powder may be added to the melt pool 24, or elements that are fugitive may be added in quantities less than, equal to, or more than the amount of the element lost during the deposition process, thereby allowing for a custom composition to be achieved in the clad material without the necessity of purchasing custom powder material The melting of foils together with powders in a material deposition process provides for convenient and precise control of the as-clad material composition. For applications where foils of the smallest commercially available thickness provide too much of the fugitive element, smaller amounts of the fugitive material may be provided by using a preform of the metal in a form other than that of a foil, such as in the form of strips of material or a screen mesh.

Mixing of the melted metal powder 16 and melted foil 14 is achieved naturally within the melt pool 24 due to the agitation and circulation created by the sudden and disruptive addition of the large energy flux generated by the moving energy beam 20 during the melting process. The natural buoyancy of the flux material 18 within the melt pool 24 contributes to the mixing effect, with the result being a consistent chemical composition throughout the layer of deposited material 26. The location of the layer of flux 18 above the powdered metal 16 and above the foil 14 has been shown to be effective in protecting highly reactive melted aluminum foil from the atmosphere, although other spacial arrangements may prove beneficial in other embodiments. Composite metal alloy/flux powders may also be used. Pre-placing the powders 16, 18 allows the powder to hold the foil 14 in position during the melting process, although additional powder addition coincident with heating is possible.

Figure 3:
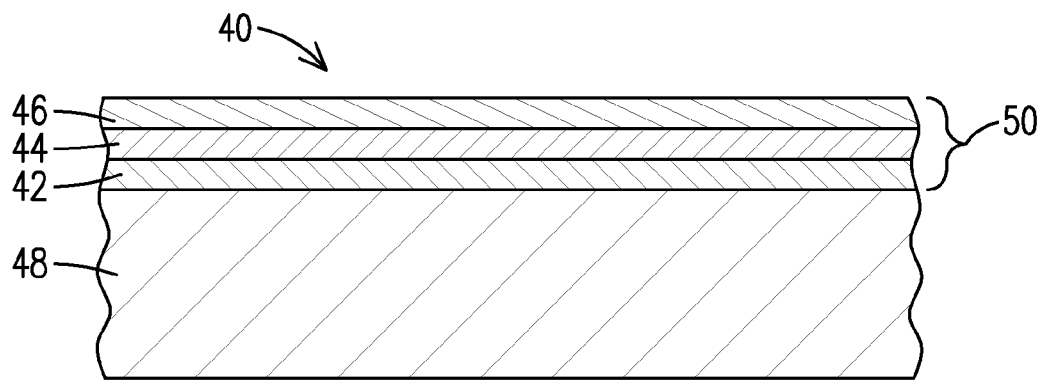
FIG. 3 is a cross-sectional view of a component having a graded composition produced by the method illustrated in FIG. 2.

FIG. 3 illustrates a product 40 formed by a process wherein metal alloy powder (not shown) is melted into consecutively deposited layers 42, 44, 46 over a substrate 48 along with respective metal preforms (not shown), to form a clad layer 50 having a desired thickness. The product 40 may be uniquely formed to have a graded composition across a thickness of the clad layer 50 by using metal preforms having different parameters between at least any two of the layers 42, 44 or 46. For example, the preforms may have a different thickness, may be of a different material composition, and/or may have a different shape (i.e. foil, screen or strips) from one layer to another.

Figure 4:
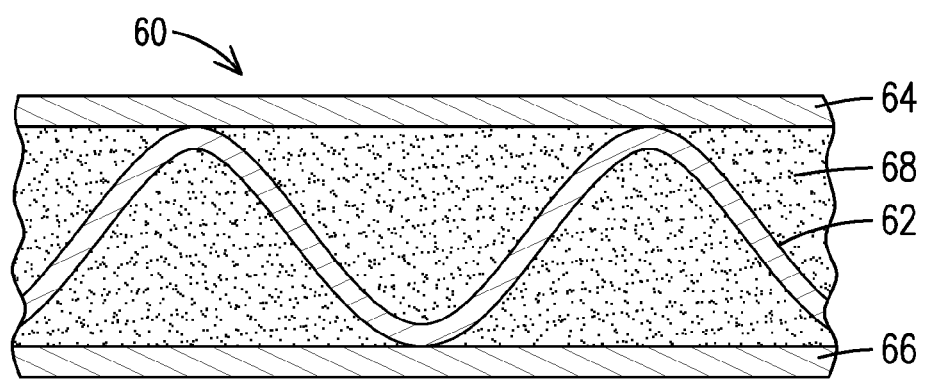
FIG. 4 is a cross-sectional view of a first foil/powder package.

The foil and powder constituents may also be prepared as a package and applied together to a surface to be clad. FIG. 4 illustrates one embodiment of a foil/powder package 60 including a non-planar center sheet of foil 62 covered by top 64 and bottom 66 sheets of foil. Powder 68 is captured within the interior volume defined between the sheets 62, 64, 66. The powder 68 may be only metal alloy or may also include flux material. The sheets 62, 64, 66 may be all of the same material and thickness, or may have differing compositions and/or thicknesses for various applications. The foil/powder package 60 may be positioned directly onto the surface to be clad without additional powder, or it may be placed on top of, within, or under a layer of powdered flux material. One will appreciate that other embodiments of foil/powder packages may used, such as one having only a top sheet or only a bottom sheet, or one where the non-planar sheet defines a honeycomb shape between top and bottom sheets.

While various embodiments of the present invention have been shown and described herein, it will be obvious that such embodiments are provided by way of example only. Numerous variations, changes and substitutions may be made without departing from the invention herein. Accordingly, it is intended that the invention be limited only by the spirit and scope of the appended claims.

The invention claimed is:

1. A method of material deposition comprising:
    selecting a powdered metal;
    selecting a metal foil comprising a composition and thickness that compensates for a processing loss of an elemental constituent of the powdered metal during deposition thereof by the method;
    disposing both the powdered metal and the metal foil over a surface of a substrate;
    melting the powdered metal and metal foil with an energy beam to form a melt pool; and
    allowing the melt pool to solidify to form a layer of the deposited material on the substrate surface.

2. The method of claim 1, further comprising:
    disposing powdered flux material with the powdered metal and metal foil over the substrate surface;
    melting the powdered flux material with the powdered metal and metal foil to form a layer of slag on the melt pool; and
    allowing the layer of slag to solidify with the melt pool; and
    removing the layer of slag to reveal the layer of deposited material.

3. The method of claim 2, wherein the powdered metal comprises a superalloy material, the metal foil comprises the elemental constituent of the powdered metal in an amount greater than the processing loss, whereby the deposited material is composed of a modified variation of the superalloy material, and the energy beam comprises a laser beam.

4. The method of claim 3, further comprising disposing the powdered metal and metal foil over the substrate surface as a package comprising a non-planar center sheet attached to at least a top or bottom sheet, or a honeycomb shape between top and bottom sheets, wherein the package defines a plurality of interior volumes containing the powdered metal.

5. The method of claim 2, further comprising disposing the metal foil within a layer of the powdered metal over the substrate surface, and disposing a layer of the powdered flux material over the powdered metal and metal foil.

6. The method of claim 2, further comprising disposing a layer of the powdered flux material over a layer of the powdered metal over the metal foil on the substrate surface.

7. The method of claim 1, further comprising positioning the metal foil onto the substrate surface and then depositing the powdered metal over the metal foil.

8. The method of claim 1, further comprising depositing the powdered metal on the substrate surface, and placing the metal foil on the powdered metal.

9. The method of claim 1 wherein the steps of disposing both powdered metal and metal foil, melting to form a melt pool, and allowing the melt pool to solidify are repeated a plurality of times over the substrate surface in order to build a plurality of the layers of deposited material to a desired thickness, and further comprising:

using a first metal foil to form a first of the layers; and
using a second metal foil having a property different than that of the first metal foil to form a second of the layers in order to produce a graded composition across the desired thickness.

10. The method of claim 9, further comprising using the second metal foil having a different thickness than a thickness of the first metal foil.

11. The method of claim 9, further comprising using the second metal foil having a different material composition than a material composition of the first metal foil.

12. The method of claim 1, further comprising selecting the powdered metal to be of a superalloy material; wherein the foil compensates for the processing loss to produce the solidified layer of the deposited material having the composition of the superalloy material.

13. The method of claim 1, wherein the substrate is composed of a superalloy material; and further comprising selecting the powdered metal to be of the same composition as the substrate; wherein the foil compensates for the processing loss to produce the solidified layer of the deposited material having the composition of the substrate.

14. A method of material deposition comprising:
selecting a powder composed of a superalloy;
selecting a metal preform comprising a composition and thickness that compensates for a processing loss of an elemental constituent of the superalloy powder during deposition thereof by the method;
disposing the superalloy powder and the metal preform onto a substrate;
melting the superalloy powder and the metal preform with an energy beam to form a melt pool;
allowing the melt pool to solidify to form a first layer of deposited material on the substrate; and
repeating the steps of disposing, melting and allowing to solidify in order to form a plurality of layers of deposited material on the substrate to a desired thickness.

15. The method of claim 14, further comprising using metal foil as the metal preform.

16. The method of claim 14, further comprising using metal preforms having different parameters between at least two of the layers in order to form a graded composition through the desired thickness.

17. The method of claim 14, further comprising disposing the superalloy powder and metal preform onto the substrate surface as a package comprising the superalloy powder enclosed within an interior volume defined between sheets of the metal preform.

18. The method of claim 17, further comprising using aluminum foil as the metal preform.

19. The method of claim 18, further comprising:
disposing powdered flux material onto the substrate with the superalloy powder and metal preform prior to the melting step;
melting the powdered flux material with the superalloy powder and metal preform to form a layer of slag over the melt pool; and
removing the layer of slag from each respective layer prior to repeating the steps of disposing, melting and allowing to solidify.

* * * * *